Patented Nov. 14, 1950

2,529,923

UNITED STATES PATENT OFFICE 2,529,923

2-(2-HYDROXYETHOXY)ETHYLAMINE

Joseph B. Dickey, Rochester, N. Y., and James G. McNally, Kingsport, Tenn., assignors to Eastman Kodak Company, Rochester, N. Y., a corporation of New Jersey No Drawing. Original application April 22, 1943, Serial No. 484,078. Divided and this application October 1, 1946, Serial No. 700,374

7 Claims. (Cl. 260—584)

This invention relates to 2-(2-hydroxyethoxy)-ethylamine and to a process for preparing the same. This application is a division of our copending application Serial No. 484,078, filed April 22, 1943, now Patent No. 2,412,209.

It is known that aliphatic monoamines can be prepared by condensing monohydric alcohols with ammonia, in the presence of a metallic hydrogenation catalyst. When dihydric alcohols, such as tetramethylene glycol and pentamethylene glycol, are condensed with ammonia, in the presence of a hydrogenation catalyst, however, a considerable amount of cyclization occurs with the formation of compounds, such as pyrrol and pyridine, so that tetramethylene diamine and pentamethylene diamine cannot be commercially prepared by this method. For this reason apparently tetramethylene diamine and pentamethylene diamine, as well as higher molecular weight diamines, are prepared by reducing the appropriate dinitriles.

We have now found that diethylene glycol can be condensed with ammonia, in the presence of hydrogenation catalysts to give a good yield of 2-(2-hydroxyethoxy)ethylamine. Some cyclization occurs and some formation of diamine occurs, but the 2-(2-hydroxyethoxy)ethylamine can be readily separated from the cyclic compounds and the diamine.

It is, accordingly, an object of our invention to provide the new compound, 2-(2-hydroxyethoxy)ethylamine. A further object is to provide a process for preparing 2-(2-hydroxyethoxy)ethylamine. Other objects will become apparent hereinafter.

In accordance with our invention, we condense diethylene glycol with ammonia, at a temperature of from about 160° C. to about 400° C., in the presence of a hydrogenation catalyst. The temperature employed is advantageously from about 200° C. to about 250° C. Exemplary of hydrogenation catalysts which we employ are: Raney nickel, copper chromite, copper nickel chromite, iron, cobalt, titanium, copper, etc. The condensation can be carried out in the liquid or gaseous phase. If the condensations are carried out in the gaseous phase, the diethylene glycol is led over the catalyst, e. g. nickel on kieselguhr, in a glass or metal tube heated to the desired temperature.

The following example will serve to illustrate the manner of practicing our invention.

*Example.—2-(2-hydroxyethoxy)ethylamine*

242 g. of diethylene glycol

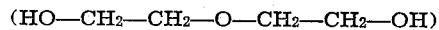
(HO—CH$_2$—CH$_2$—O—CH$_2$—CH$_2$—OH)

and 25 g. of nickel on kieselguhr were placed in an autoclave. The mixture was saturated with ammonia from a cylinder of ammonia. The autoclave was then closed and the mixture was heated at 205° C. with shaking for 37 hours. At the end of this time, the autoclave was cooled and the contents made acid with hydrochloric acid. The monobasic materials were then removed from the mixture by distillation under reduced pressure. To the residue was added an excess of 50 per cent aqueous sodium hydroxide to free the amino bodies from their hydrochlorides. The amines which separated were removed from the aqueous liquors and fractionally distilled, first at ordinary pressures and then under reduced pressures. Morpholine boiling at 182° to 184° C. at 745 mm. of mercury pressure, and a good yield of 2-(2-hydroxyethoxy)ethylamine boiling at 123° C. at 7 mm. of mercury pressure, were obtained. In addition there was obtained a small amount of some amines boiling between 135° C. and 180° C. at 7 mm. of mercury pressure.

What we claim and desire to be secured by Letters Patent of the United States is:

1. 2-(hydroxyethoxy)ethylamine.

2. A process for preparing 2-(2-hydroxyethoxy)ethylamine comprising condensing ammonia with diethylene glycol, at a temperature of from 160 to 400° C., in the presence of a hydrogenation catalyst.

3. A process for preparing 2-(2-hydroxyethoxy)ethylamine comprising condensing ammonia with diethylene glycol, at a temperature of from 160 to 400° C., in the presence of a metallic hydrogenation catalyst.

4. A process for preparing 2-(2-hydroxyethoxy)ethylamine comprising condensing ammonia with diethylene glycol, at a temperature of from 160 to 400° C., in the presence of a nickel hydrogenation catalyst.

5. A process for preparing 2-(2-hydroxyethoxy)ethylamine comprising condensing ammonia with diethylene glycol, at a temperature of from 200 to 250° C., in the presence of a hydrogenation catalyst.

6. A process for preparing 2-(2-hydroxyethoxy)ethylamine comprising condensing ammonia with diethylene glycol, at a temperature of from 200 to 250° C., in the presence of a metallic hydrogenation catalyst.

7. A process for preparing 2-(2-hydroxyethoxy)ethylamine comprising condensing ammonia with diethylene glycol, at a temperature of from 200 to 250° C., in the presence of a nickel hydrogenation catalyst.

JOSEPH B. DICKEY.
JAMES G. McNALLY.

REFERENCES CITED

The following references are of record in the file of this patent:

UNITED STATES PATENTS

| Number | Name | Date |
| --- | --- | --- |
| 1,518,689 | Callsen | Dec. 9, 1924 |
| 2,285,419 | Dickey et al. | June 9, 1942 |
| 2,383,236 | Dunstan et al. | Aug. 21, 1945 |
| 2,412,209 | Dickey et al. | Dec. 10, 1946 |

FOREIGN PATENTS

| Number | Country | Date |
| --- | --- | --- |
| 398,010 | Germany | July 3, 1924 |
| 119,569 | Australia | Apr. 20, 1943 |

Certificate of Correction

Patent No. 2,529,923 November 14, 1950

JOSEPH B. DICKEY ET AL.

It is hereby certified that error appears in the printed specification of the above numbered patent requiring correction as follows:

Column 2, line 32, for "2-(hydroxyethoxy)" read *2-(2-hydroxyethoxy)*; and that the said Letters Patent should be read as corrected above, so that the same may conform to the record of the case in the Patent Office.

Signed and sealed this 23rd day of January, A. D. 1951.

[SEAL]

THOMAS F. MURPHY,
*Assistant Commissioner of Patents.*